United States Patent

Plow et al.

Patent Number: 5,815,389
Date of Patent: Sep. 29, 1998

[54] SYSTEM LEVEL CURRENT LIMITING

[75] Inventors: Robert J. Plow, Avon Lake; Thomas G. Lock, Elyria; James A. Giancaterino, Sheffield Lake; John E. Mitchell, Vermilion, all of Ohio

[73] Assignee: Reltec Corporation, Lorain, Ohio

[21] Appl. No.: 726,318

[22] Filed: Oct. 3, 1996

[51] Int. Cl.$^6$ ............................. H02M 7/00; H02J 7/04
[52] U.S. Cl. ............................................. 363/67; 320/134
[58] Field of Search .................................. 363/67, 51, 65; 307/52, 59, 61, 62, 64; 320/102, 134, 39, 24

[56] References Cited

U.S. PATENT DOCUMENTS

| | | | |
|---|---|---|---|
| 4,106,097 | 8/1978 | Fox et al. | 307/52 |
| 5,530,335 | 6/1996 | Decker et al. | 320/5 |
| 5,557,188 | 9/1996 | Piercey | 320/5 |

*Primary Examiner*—Peter S. Wong
*Assistant Examiner*—Rajnikant B. Patel
*Attorney, Agent, or Firm*—Ray, Sharpe, Beall, Fagan, Minnich & McKee

[57] ABSTRACT

A power distribution system, having distributed intelligence, includes a controller in communication with a plurality of rectifiers/power conversion units (PCUs). The controller and rectifiers/PCUs communicate with each other to generate system level current limit via a single control point, where system level current limit is accomplished by controlling the individual current limits of the rectifiers/PCUs. The system level current limit operating in combination with ambient temperature sensors, battery temperature sensors, load current sensors, and battery re-charge current sensors to control the operation of the system. The above sensors are also used in combination with a system level voltage control.

17 Claims, 9 Drawing Sheets

SYSTEM LEVEL CURRENT LIMITING

BACKGROUND OF THE INVENTION

This application pertains to the art of power distribution and more particularly to providing system level current limit control through a single control point, accomplished by controlling individual current limits of rectifiers/power conversion units (PCUs) of the power distribution system.

The invention is particularly applicable to power distribution systems having distributed intelligence, where such a system includes a controller in operative connection with a plurality of rectifiers/PCUs configured to supply a load and also including a back-up battery configuration for supplying the load when the plurality of rectifiers/PCUs are not able to fully meet load requirements. It will be appreciated, however, that the invention has broader applications and may be advantageously employed in other situations that impose similar constraints in the power supply arts.

Current limiting is a standard feature found in rectifiers/PCUs presently used in power distribution settings and is particularly useful in the communications industry. A primary purpose of such current limiting is that is provides a manner to parallel rectifiers of common output voltage, as well as serving as protection against undesirable overloads.

It is recognized that due to problems within rectifiers/PCUs, or due to external events, rectifiers/PCUs will at times shut down or operate at less than full output. When rectifiers/PCUs enter a shut down or reduced operation state, back-up batteries are used to supplement energy needs of the load. Back-up batteries, previously charged to a predetermined voltage level, discharge into the load to maintain operation at a desired level. Upon returning to normal operation, the rectifiers/PCUs again act to supply power to the load, removing the need for power supplied by the back-up batteries. During the time the back-up batteries supply the load they are discharging the power which has been stored within their cells, thereby lowering their voltage levels. Thus, it is necessary to re-charge the back-up batteries to a fully charged level.

Commonly, back-up batteries are re-charged through the use of the rectifiers/PCUs. When the rectifiers/PCUs operate in a normal state, current is supplied not only to the load but is also used to re-charge the back-up batteries.

In existing systems when the rectifiers/PCUs have completely shut down or are operating at a lowered output, the back-up batteries will automatically begin discharging to the load, in order to maintain the load at a predetermined output. If the back-up batteries supplement or fully supply the load for an extended time they will discharge to a low level, and once the rectifiers/PCUs return to full operation, the back-up batteries draw high amounts of current in order to re-charge as quickly as possible. This fast re-charge tendency has several drawbacks including causing the back-up batteries to overheat to the point that, under certain conditions, they will enter a thermal runaway condition resulting in the destruction of the back-up batteries.

Therefore, it is common to provide current limiting features to limit the re-charge rate of the back-up batteries. One battery charge current limiter arrangement has been proposed in commonly assigned U.S. Ser. No. 08/691,038 to Aiken, et al., entitled "Battery Charge Current Limiter", whose teachings are hereby incorporated by reference.

It has also been known that due to harsh high temperature levels which exist at outdoor power distribution enclosures, it was found to be beneficial to control thermal current limiting. This type of enhancement of current limiting provides a linear derating of the output current capacity of the rectifiers/PCUs based upon operating temperature. When operating within rated temperature limits, the rectifiers/PCUs provide full output current rating. As the temperature increases above that maximum rating, the current limit set point of the PCUs/rectifiers are automatically decreased to maintain safe operating temperatures within the rectifiers/PCUs. One type of thermal current configuration is set forth in commonly assigned U.S. Ser. No. 08/576,784, to Kammiller, et al., entitled "Power Supply System Including Thermal Current Limiting Protection", whose teachings are hereby incorporated by reference. Previous to the use of thermal current limiting, rectifiers had the option of shutting off, allowing the battery to provide all of the load current or run the risk of overheating.

In existing systems, current limiting features are set to each individual rectifier/PCU in the power distribution system. However, power distribution systems commonly include a large number of rectifiers/PCUs. Due to this arrangement, it is necessary, in existing systems, to adjust each rectifier/PCU of the system including the current limiting features. Such a configuration entails a significant amount of work by an operator who is required to adjust potentiometers or other set point switches on each individual rectifier/PCU. This individual setting increases the likelihood of operator error in the setting operation thereby reducing the effectiveness of the overall system. It is also noted that this is not a dynamic approach, in that once a rectifier/PCU is set at a particular output value, if there is a change in operating circumstances the operator must again go to each of the individual rectifiers/PCUs and adjust the current limit.

In view of this, it has been determined desirable to provide a capability of providing system level current limit control—as opposed to rectifier level control—adjustable via a single control point, where such control is accomplished by controlling the individual current limits of rectifiers/PCUs.

It has also been determined desirable to use the system level current limit control and a system level voltage control to provide dynamic, ambient temperature sensing, battery temperature sensing, load current sensing, and battery current sensing.

SUMMARY OF THE INVENTION

The present invention contemplates a new and improved power distribution system that overcomes the above noted problems and others, and which provides system level current limit control through a single control point in a controller, wherein the power distribution system is a distributed intelligent network and entry of the desired system level current limit value in the controller acts to automatically adjust the current limit features of a plurality of intelligent rectifiers/PCUs.

With attention to another aspect of the present invention, system level current limit control, as well as system level voltage control are used to control the output of the rectifiers/PCUs in accordance with ambient temperature sensing, battery temperature sensing, load current sensing and battery current sensing.

A principal advantage of the present invention is the ability to provide a power distribution system which includes system level current limit as opposed to current limiting at a rectifier/PCU level.

Another benefit of the present invention is an increased flexibility of the system, wherein when a rectifier/PCU is added the system level current limit will increase, with each rectifier/PCU having an apportioned current limit, and when a rectifier/PCU is removed the system can maintain the system level current limit and reapportion the current limit for each of the remaining rectifiers/PCUs.

Yet another benefit of the present invention is the ability to dynamically adjust the current limits of individual rectifiers/PCUs in response to changes in the elements or operation of the system.

Still yet another benefit of the present invention is to easily adjust the system level current limit in response to a change in the load requirements. Particularly, when the load requirements change use of the single input point for controlling the system level current limit control allows for an easy and if desired automatic adjustment of the overall current limit of the system.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DESCRIPTION OF THE PREFERRED EMBODIMENTS

Figure 1:
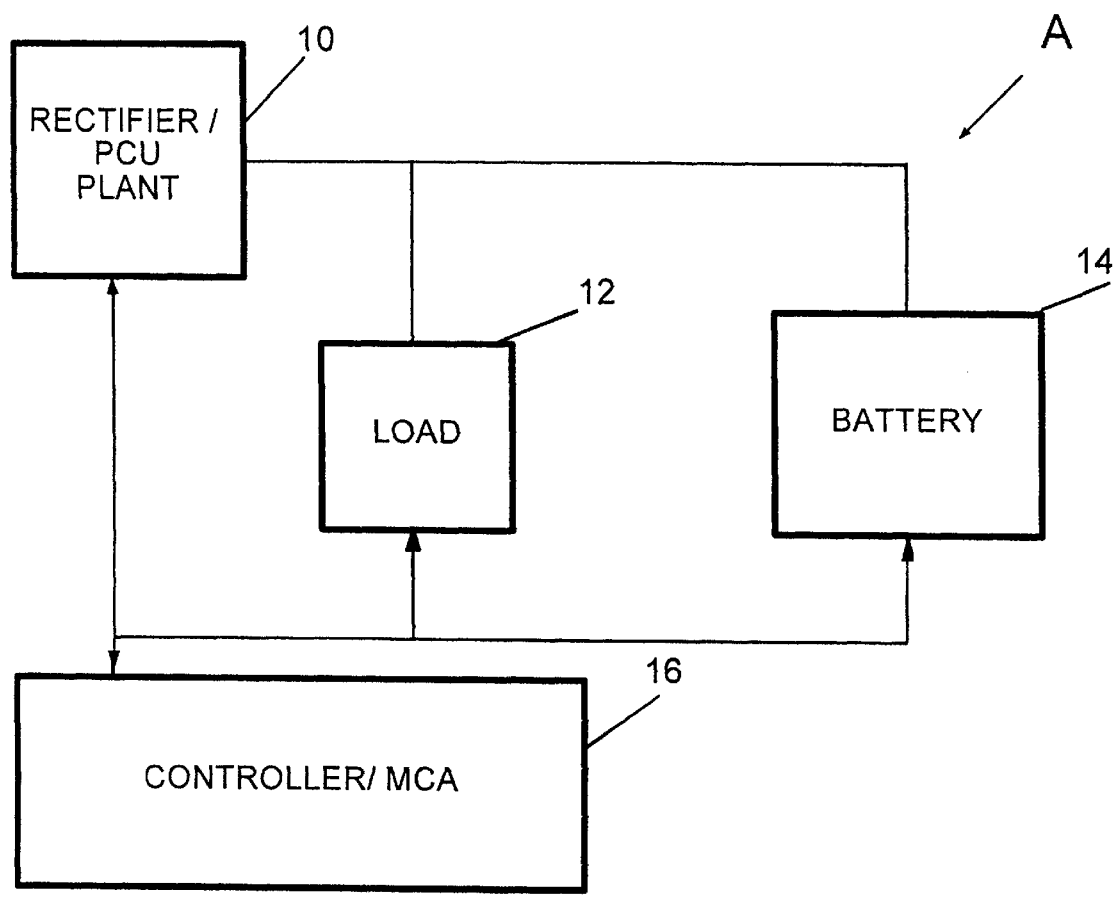
FIG. 1 is a block diagram of a power distribution system in accordance with the subject invention.

As illustrated in FIG. 1, power distribution system A, which may be a communication power distribution system, is provided with a regulated voltage output power supply, such as rectifier/power conversion unit (PCU) plant 10 which is used to supply load 12. In instances when rectifier/PCU plant 10 enters an off or low output state, and is not capable of fully supplying load 12, back-up battery system 14, which is in a float condition in parallel with rectifier/PCU plant 10, automatically acts to supply load 12 with an output sufficient to supplement that output reduced due to the reduction or shut down of rectifier/PCU plant 10. Controller 16 provides overall system control for power distribution system A, which is a distributed intelligent system, since intelligence is distributed throughout the system, such as in controller 16 and rectifier/PCU plant 10.

Figure 2:
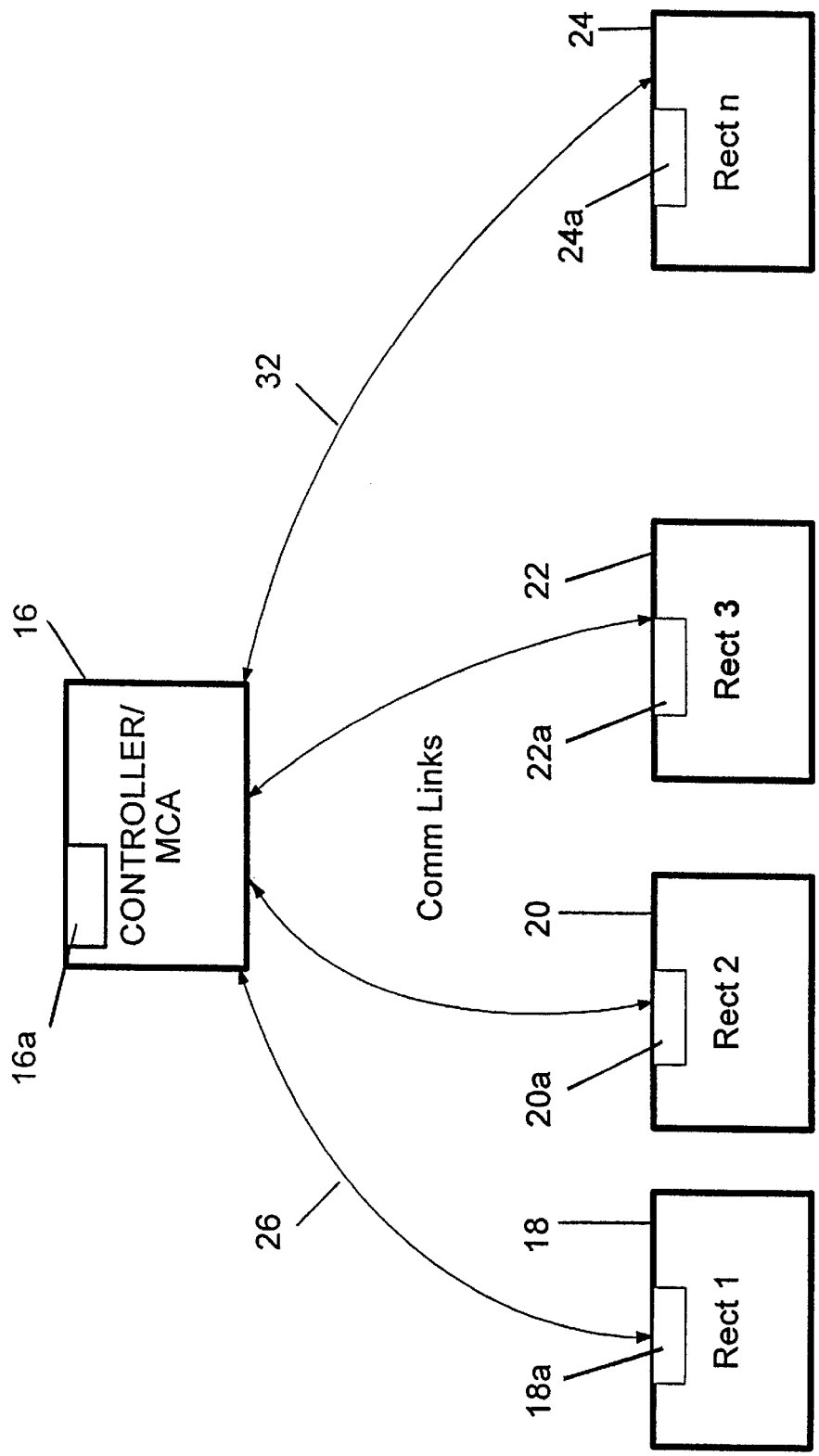
FIG. 2 illustrates a controller(MCA)/rectifier(PCU) communication link having individual connections.
Figure 3:
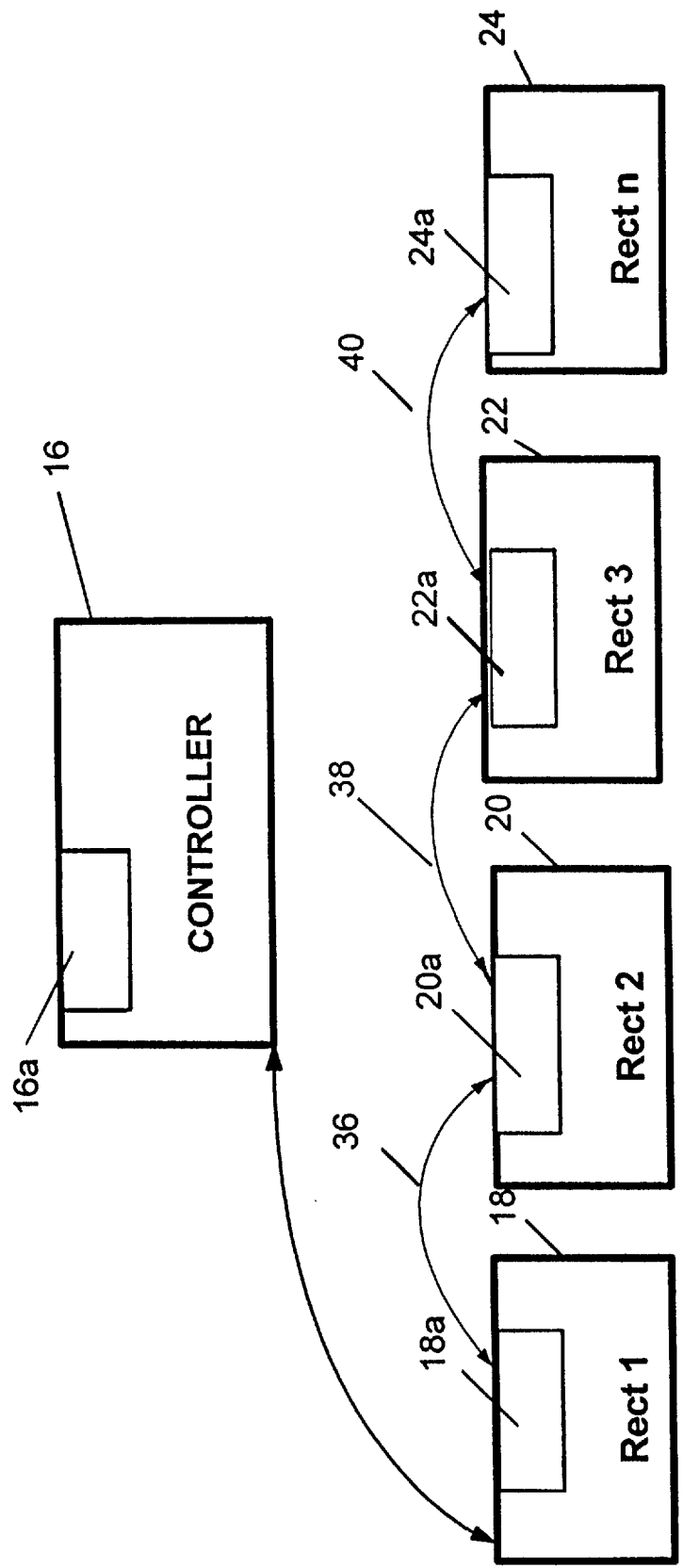
FIG. 3 is a controller(MCA)/rectifier(PCU) communication link is a daisy-chain configuration.

As illustrated in FIG. 2, controller 16 and rectifiers/PCUs 18–24, which make up rectifier/PCU plant 10, have communication links 26–32 for passing information between controller 16 and rectifiers/PCUs 18–24. The communication links between controller 16 and rectifiers/PCUs 18–24 in FIG. 2 illustrate individual connections between the rectifiers/PCUs 18–24 and controller 16. In addition to this arrangement, as illustrated in FIG. 3, communication between rectifiers/PCUs 18–24 and controller 16 are also capable of being formed in a daisy-chain arrangement. Particularly, communication links 34–40 are interconnected in such a manner as to form a daisy-chain format between rectifiers/PCUs 18–24 and controller 16.

In a preferred embodiment, controller 16 and rectifiers/PCUs 18–24 are modular units connected by a plug-in type connection to a bus back-plane that allows communication between rectifiers/PCUs 18–24 and controller 16. The bus back-plane constructed to have defined slots for controller 16 and rectifiers/PCUs 18–24.

Controller 16, in the preferred embodiment, may include one of many known microprocessors, and is capable of receiving input from external sources, delivering information to rectifiers/PCUs 18–24 and receiving information therefrom. While in the preferred embodiment controller 16 has been designed to include a microprocessor, controller 16 may also be other types of analog or digital devices which provide the necessary intelligence and communication capabilities, and may contain integrated or discrete circuits. Controller 16 may also be called a meter, control and alarm circuit (MCA).

The rectifiers/PCUs 18–24 include distributed intelligence in the form of a microcontroller or other device 18a–24a capable of communication with controller 16.

Communication links 26–32 and 34–40 between controller 16 and rectifiers/PCUs 18–24 allow for transmission of information between these elements. While in the preferred embodiment, the communication links are a two wire twisted pair, it is to be appreciated that the communication links can be a single wire, multiple wires, optical cable, radio frequency (RF), infra-red, or other type communication media.

A distinction between rectifiers and PCUs is found in industry definitions. Particularly, Bellcore Labs requires certain elements or functions be included within a rectifier. Among the Bellcore criteria is the inclusion of metering capabilities. On the otherhand, the present inventors define a PCU as a block that receives power and converts it. While the inventors are aware that as part of the power distribution system, the entire system will require metering of the power, it is not necessary that each unit, i.e. PCU, includes metering capabilities. Therefore, the PCU is constructed so some of the functionality of the metering can take place at a system level.

Therefore, it is not necessary that all the monitoring and other requirements of Bellcore criteria be included in a PCU. However, the functionality of both the rectifiers, according to Bellcore specifications, and that of PCUs are equivalent and the present invention is capable of being implemented with both types of elements or other similar rectification devices having intelligence and communication capabilities.

In communication between controller 16 and rectifiers/PCUs 18–24 various signals are provided back and forth in the present embodiment. Among these are: Commands sent from the controller (MCA) to the rectifiers (PCUs):

the present output voltage setting for each individual PCU;

the default output voltage setting in the event of MCA failure;

the present output current limit setting for each individual PCU (the default current limit setting is 100% in the event of MCA failure);

the present high-voltage shutdown (HVS) threshold setting for each individual PCU;

the default high voltage shutdown (HVS) threshold setting in the event of MCA failure; and, a status bit (TRIN) which turns off each individual PCU's power converter and resets its high-voltage shutdown (HVS) threshold;

Replies sent from the PCUs to the MCA:

the present output current reading of each PCU;

the present operating status of each PCU including the following defined statuses:
HIACLINE AC feed to the PCU is above high line limit
NEEDDFT Need default output voltage/HVS configuration
ADCFAIL A/D converter has failed
NEEDCFG Need output voltage/current configuration
FANFAIL Fan has slowed or stopped
TROUT Unit has been turned off for some reason
CB20PEN Output circuit breaker is open
CNVFAIL One of the conversion elements has failed
THRMCL DC-DC element is in thermal current limit
ESTOP Emergency stop input is active
S1OFF Input switch is turned off
HVS PCU in high-voltage shutdown
ACOUT AC feed to PCU is out
COMMFAIL Communications between the PCU and MCA have been lost
SNSLOSS Sense lead open—sense switched to local In the present communication system, each rectifier/PCU 18–24 includes an ID which can be transmitted with or otherwise read by controller 16 in order to identify which rectifier/PCU 18–24 controller 16 is transmitting data to and/or which rectifier/PCU 18–24 is sending data to controller 16.

Using the distributed intelligence of power distribution system A, it is possible to provide system level current limit control by use of a single control point, which in turn controls the individual current limits of rectifiers/PCUs 18–24.

Obtaining system level current limit requires use of controller 16 and rectifiers/PCUs 18–24, which include distributed intelligence such as microcontrollers 18a–24a. System level current limit control is accomplished in power distribution system A by having rectifiers/PCUs 18–24 inform controller 16, via the communications links 26–32 or 34–40, what are the ratings of each rectifier/PCU 18–24. The load and battery re-charge values are summed to determine a desired system level current limit value.

This system level current limit value is then set into controller 16 by a user, or is automatically set by controller 16 based on received data.

In the present embodiment inputting of the system level current limit value as a set point is accomplished by a user through use of push-button controls on control panel 16a of controller 16. The set point can also be set into controller 16 via a remote interface by known techniques. The system level current limit set point entered into controller 16 will be less than or equal to total plant capacity. Controller 16 then divides/apportions this set point value between the number of existing rectifiers/PCUs 18–24 detected by controller 16.

If controller 16 receives, from rectifiers/PCUs 18–24 data indicating that the rectifiers/PCUs are of the same capacity, this division is made equally among each individual rectifier/PCU. However, if controller 16 determines rectifiers/PCUs 18–24 are of different capacities, the current limit values are divided proportionally to the capacity of each rectifier. This current limit value data is then sent to rectifiers/PCUs 18–24 via communication links 26–32 or 34–40. Using this information, rectifiers/PCUs 18–24 set their individual current limits as required, in a known manner. Thus, power distribution system A, as a whole current limits at a value equal to the sum set by the individual rectifiers/PCUs 18–24.

Figure 4:
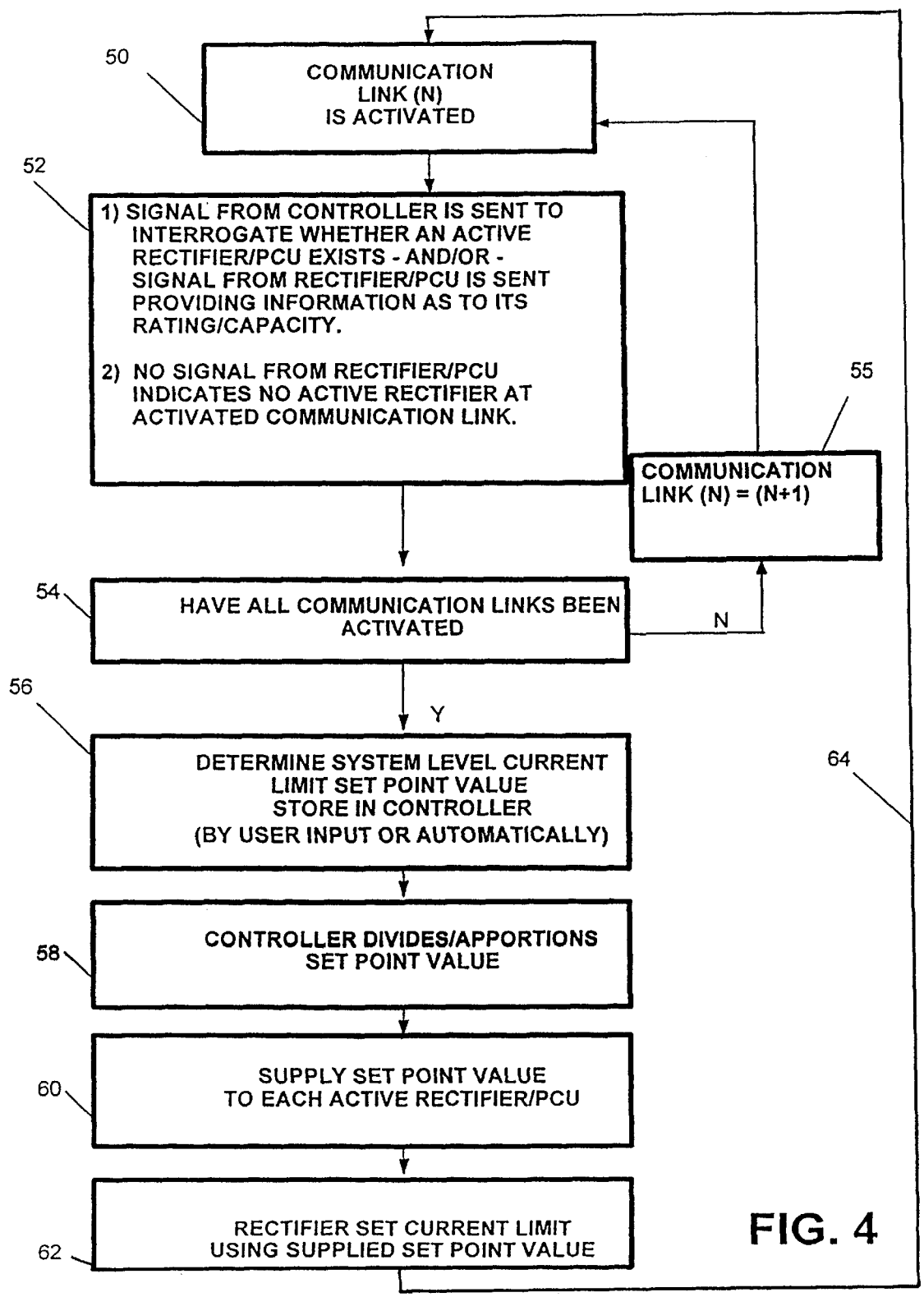
FIG. 4 is a flow chart in accordance with the teachings of the subject invention.

As more particularly detailed in the steps of FIG. 4, in order to set a system wide current limit level, each communication link is activated by either a signal from the controller or one of rectifiers/PCUs 50. The rectifier/PCU at a location indicates its existence and provides information as to its ratings and capacities to the controller, and alternatively, when no signal is provided to the converter this acts as an indication that no active rectifier/PCU is at the location, i.e. connected to that communication link 52. It is to be appreciated that during communication between the controller and rectifiers/PCUs, the controller is able to read information programmed into each rectifier/PCU, such as its serial (ID) number, software version number, nominal input voltage, nominal output voltage, nominal output current, etc.

Next, there is a determination of whether all positions have been interrogated and/or heard from 54. If additional locations are still to be interrogated or heard from, the process will be repeated for a next communication link. It is appreciated that while the present explanation discusses a sequential testing of communication links, the controller can also send a broadcast signal intended to reach all active rectifiers/PCUs. Similarly, all active PCUs can also be configured to broadcast to the controller in a non-sequential type order.

Once all locations which can contain a rectifier/PCU have been interrogated or heard from, the process moves to step 56 where a desired system level current limit set point is entered into the controller. The controller divides or otherwise apportions this set point value 58, based on the information developed in steps 50–54, for example, the number of rectifiers/PCUs and their ratings and capacities.

When it is determined from receipt of information in steps 50–54 that all rectifiers/PCUs are of the same rating, then the set point value is divided equally among each rectifier/PCU. However, when a rectifier/PCU of a different rating is determined to be included within the system, proportional allotment of current limit values is provided. These values are then supplied to each of the sensed or reporting rectifiers/PCUs 60.

The rectifiers/PCUs which receive the set point values from the controller then use this information to set their individual current limit values 62. Thus, power distribution system A as a whole, current limits at a value equal to the sum set in the individual rectifiers/PCUs. Line 64 illustrates a continuous looping back for reinterrogation and communication between rectifiers/PCUs and the controller.

Figure 8:
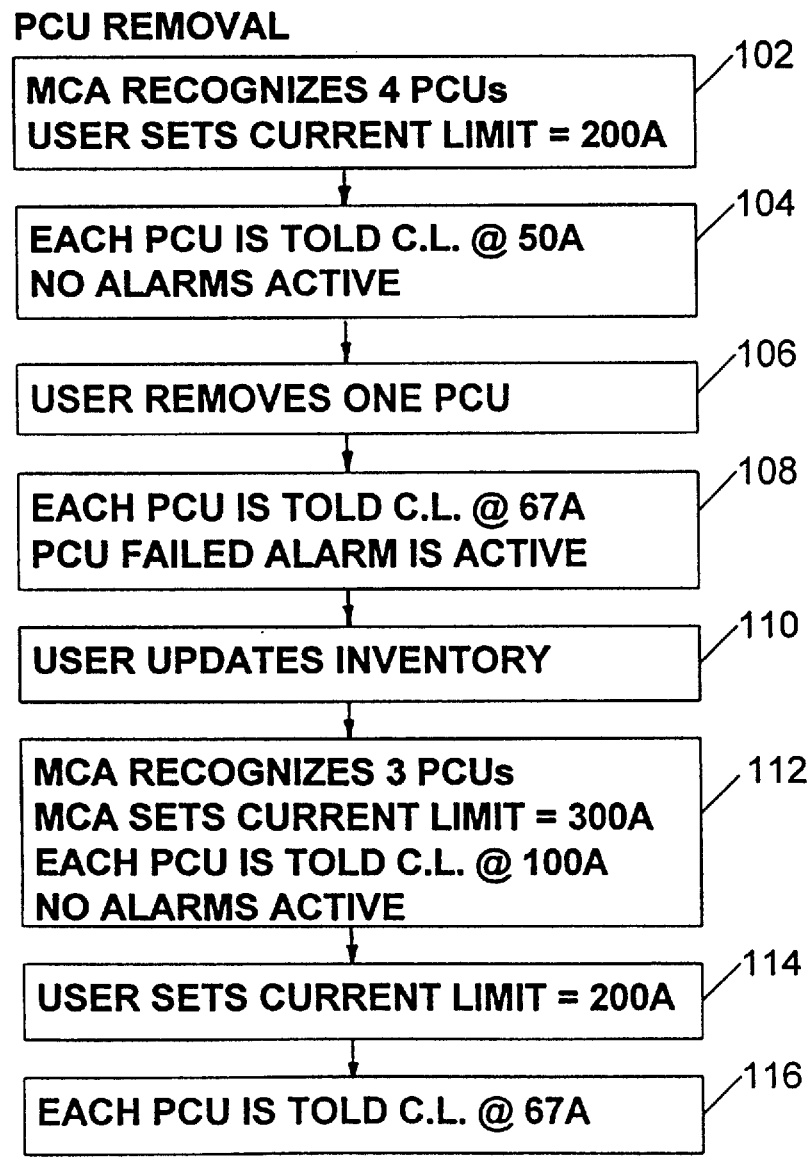
FIG. 8 is a flow chart showing a process occurring upon removal of a rectifier/PCU.
Figure 9:
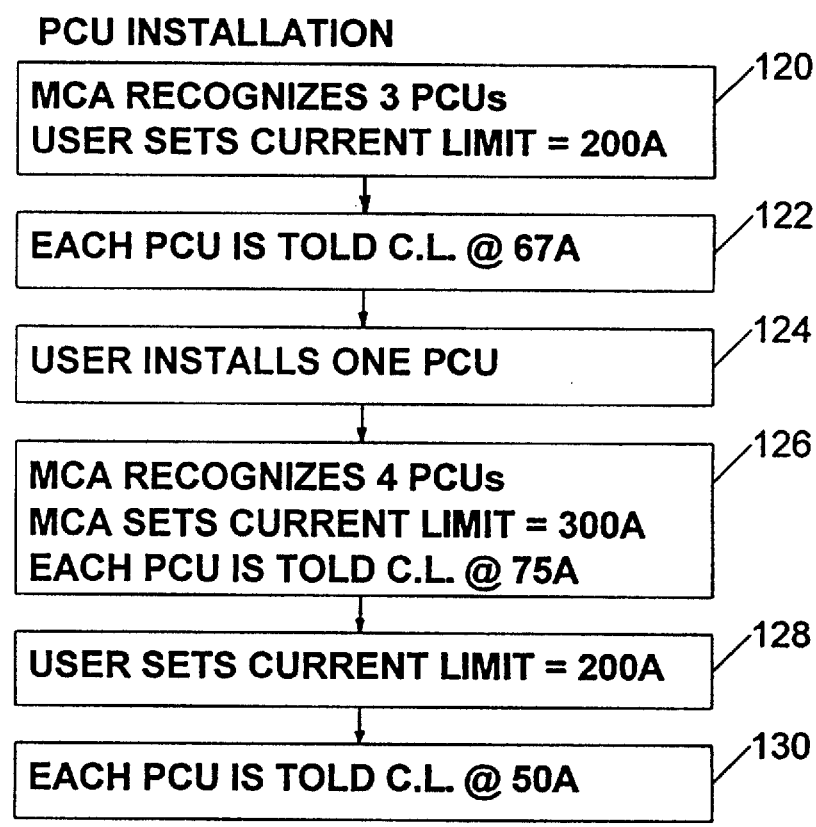
FIG. 9 is a flow chart showing a process occurring upon installation of a PCU.

The present system is configured to be dynamic upon the removal or installation of additional rectifiers/PCUs into the system, as illustrated more particularly in FIGS. 8 and 9.

FIG. 8 illustrates the process which occurs, according to one embodiment of the subject invention, upon the removal of a rectifier/PCU. This process begins when the system is operating.

Particularly, the controller/MCA has recognized that four rectifiers/PCUs are in the system, and the system level current limit value is set at 200 amps. The system level current limit value may be set by a user or alternatively set automatically as is discussed elsewhere in this application, 102. In step 104, each rectifier/PCU is informed by the controller/MCA that its current limit is to be set at 50 amps, at this point no alarms are activated and each rectifier/PCU sets its current limit to the appropriate value. In step 106, a user removes a rectifier/PCU 106. In this explanation the rectifier/PCU is removed by a user, it is to be appreciated however, that a failure of the rectifier/PCU may also occur.

In step 108, each rectifier/PCU is informed by controller/MCA that the individual current limit is now to be at 67 amps and a rectifier/PCU fail alarm is activated. Next, the user updates the inventory 110. The inventory is a data area located within the controller/MCA which contains concerning the configuration of the system, including the number of rectifiers/PCUs.

In step 112, the controller/MCA recognizes that there are now three rectifiers/PCUs within the system, and in response thereto the controller/MCA sets the system level current limit to 300 amps. Upon the resetting of the system level current limit, each rectifier/PCU is then provided by the controller/MCA with an individual current limit value of a 100 amps, and no alarms are activated.

In step 114, a user sets the system level current limit back to 200 amps such that in step 116 the remaining active rectifiers/PCUs are provided with an individual current limit values of 67 amps.

While in step 114, it is noted that the user has set the system level current limit to 200 amps, such setting of the system level current limit is possible in an automatic fashion as has been discussed at other locations in this application.

The present invention also provides for installation of additional rectifiers/PCUs as illustrated in FIG. 9.

In particular, in step 120, the system is in an operation where the controller/MCA has recognized three PCUs and the system level current limit value has been set to 200 amps. In step 122, each rectifier/PCU is informed by the controller/MCA that its current limit will be 67 amps. At this point, when a user installs an additional PCU step 124, the controller/MCA recognizes that four rectifiers/PCUs have been entered into the system. At this point the MCA sets the system level current limit value to 300 amps and each rectifier/PCU is informed that its current limit is 75 amps 126. At this point, the user sets the system current limit to 200 amps 128, such that each rectifier/PCU is informed that the current limit is 50 amps, 130.

It is to be appreciated that the setting of the system level current limit back to 200 amps may be accomplished in an automatic manner as has been previously discussed.

In the present embodiment the rectifier/PCU is considered by the controller to be unable to deliver current if the following logical equation is true:

TRIN|TROUT|CB20PEN|CNVFAIL|S1OFF|HVS|ACOUT|HIAC LINE|COMMFAIL|(FANFAIL & THRMCL)

When the above equation is true and it is determined no current is being delivered from a particular rectifier/PCU location, controller 16 recalculates the set points of the active rectifiers/PCUs and redistributes the new set point values to the rectifiers/PCUs.

Under the present scenario if there are four rectifiers/PCUs 18–24 of equal ratings, and controller 16 determines the output of system A should be current limited to 100 amps, each rectifier/PCU will be set at a current limit of 25 amps.

If, however, it is determined one of the rectifiers/PCUs is not operable e.g. due to the above logical equation, or if no response was provided from one of the rectifier/PCU locations, controller 16 recalculates the output requirements of the individual rectifiers/PCUs necessary to maintain the overall system level current limit, e.g. each of the remaining rectifiers/PCUs are again, shown adjusted to have a current limit of 33.33 amps.

With additional attention to FIGS. 8 and 9, steps 114 and 128 show that the user sets the current limit value once a rectifier/PCU has either been removed or installed. Previous to the user resetting the system level current limit value to 200 amps, the system level current limit was adjusted to 300 amps for a time period. It is to be appreciated, however, that the controller/MCA can be programmed such that a default position, upon addition or removal of a rectifier/PCU, will be either one of maintaining the newly recognized system level current limit or readjusting the system level current limit back to a previous system level current limit value. This feature provides flexibility to the present invention, since for some installations it may be desirable to maintain the original system level current limit set point, whereas in different installations it may be desirable to keep a new system level current limit set point once a rectifier/PCU has been removed and/or installed.

In modern rectifiers/PCUs, which are high frequency type switch mode devices, adjustment of the pulse width modulation allows for systems which are voltage controlled and/or current controlled. In normal operation the rectifiers/PCUs in such systems operate in a voltage control mode with a constant voltage output. This occurs until the output of the system reaches a current limit point. The system becomes a constant current system with a constant current output. As a load increases during the constant current mode, the voltage will be reduced to maintain a constant output power.

For system level current limiting according to the present invention, the output voltage is controlled by shifting the current limit point so the current limit point is moved to the desired set point to obtain actual control of the current entering the back-up battery, by reducing the voltage. The voltage is reduced since the system is entering a current limit mode. Therefore, this is a somewhat circular scenario wherein by entering the current limit the voltage is being reduced, and when the voltage is reduced there is not as much current going into the back-up batteries.

A variation of the above discussed system level current limit control, provides a rough system level current limit control by having a number of rectifiers/PCUs with fixed individual current limits that are turned on or off by controller 16. The system level current limit is equal to the sum of the individual current limits of the units which are turned on. This arrangement will allow for rough system level current limit which is approximately equal to the system current limit asked for by the controller, within the resolution available by turning a unit on or off.

Figure 5:
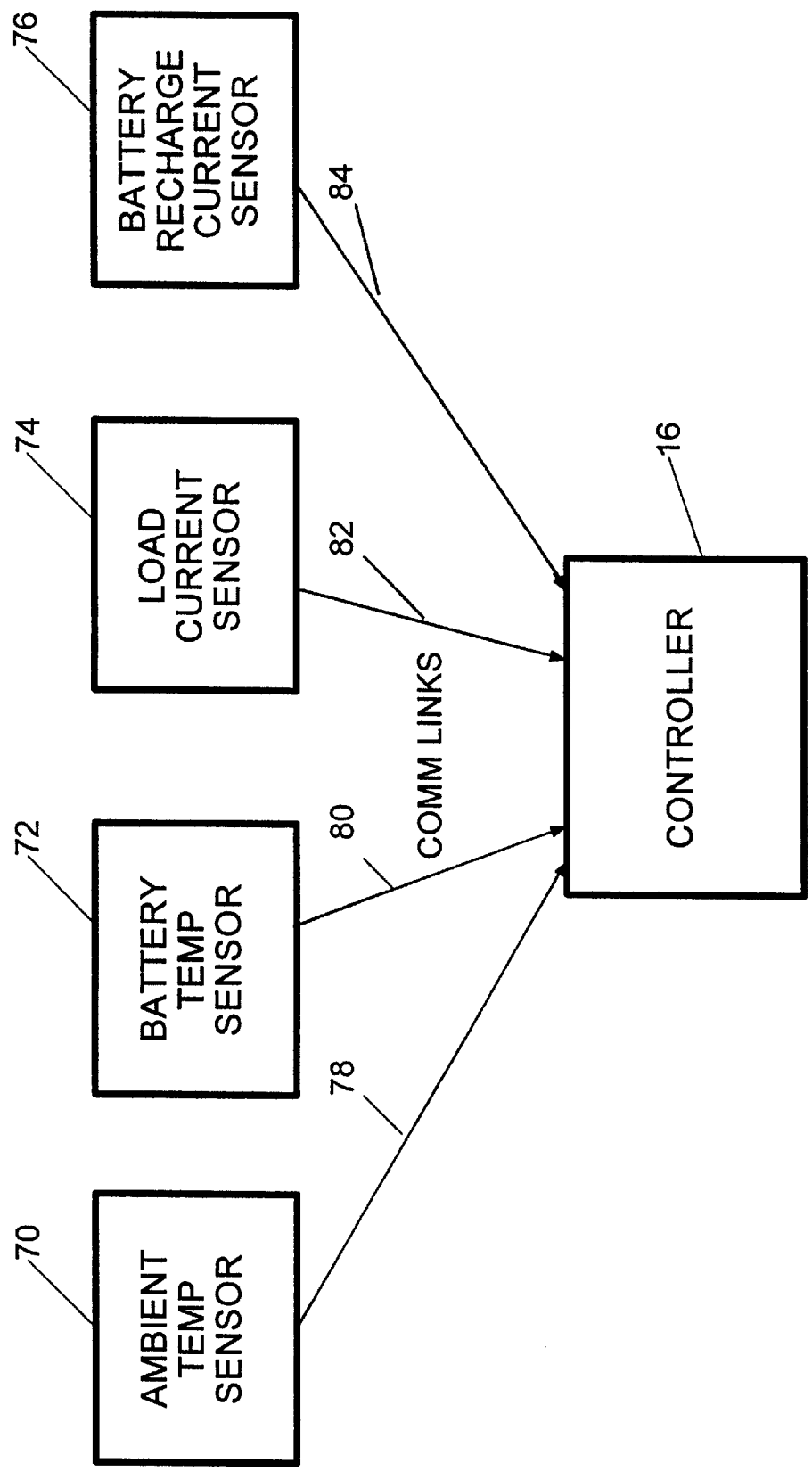
FIG. 5 illustrates additional features which can be used in accordance with the subject invention.

It is possible to use the above described system level current limit with an ambient temperature sensor, battery temperature sensor, load current sensor, and/or battery current sensor to obtain additional single point control of power distribution system A. Particularly, as illustrated in FIG. 5, the ambient temperature sensor 70, battery temperature sensor 72, load current sensor 74 and battery recharge current sensor 76 are shown provided with communication links 78–84 to controller 16. These sensors may be used individually or in combination in power distribution system A. Further, while the communication links 78–84 of FIG. 5 are shown in an individual configuration, they may be provided in a daisy-chain arrangement with rectifiers/PCUs 18–24 of FIG. 3 or in their own daisy-chain arrangement.

Ambient temperature sensor 70 provides ambient temperature information to controller 16, allowing the system level current limit to be made variable with the ambient temperature. This results in a "built in" Thermal Current Limit wherein there is a lowering of system level current limit at high ambient temperature in order to limit power dissipation and thus heat in the rectifiers/PCUs 18–24. Controller 16 automatically adjusts the system level current limit as described above by arranging the controller to correlate the received temperature variations with a new desired system level current limit. For example, when the signal from the ambient temperature sensor is, for example, 10° C. above a predetermined ambient temperature value for a previously set system level current limit, controller 16 uses this information in conjunction with a look-up table or by some other manner or calculation to determine a new system level current limit value. This new system level current limit value is then apportioned by controller 16 and provided to rectifiers/PCUs 18–24 as previously discussed.

Battery temperature sensor 72 provides battery temperature information to controller 16, allowing the system level current limit to be variable with the battery temperature. This also allows adjusting of the system level current limit value, and thus the available battery recharge current, at high battery temperatures, resulting in longer battery life. The capability of using battery temperature sensor 72 to vary the system level current limit with the battery temperature is achieved in the same manner as discussed in connection with the ambient temperature sensor 70.

Load current sensor 74 acts to provide load current information to controller 16. This allows controller 16 to add the load current to a predetermined battery re-charge current. The system level current limit value is then set at this point and the battery re-charge current is not exceeded, resulting in longer battery life.

Battery current sensor 76, provides battery charge current information to controller 16. This information allows controller 16 to adjust the current limit set point so that the battery charge current never exceeds a preset level, resulting in longer battery life.

The above discussed ambient temperature sensor 70, battery temperature sensor 72, load current sensor 74 and battery current sensor 76—except for the load current sensor 74 and battery current sensor 76 which provide the same results—may be used in any combination with each other, in conjunction with the system level current limit.

With attention to distinctions between the operation of the ambient temperature sensor 70 and the battery temperature sensor 72, it is noted that the location of the sensors in system A, and what the sensors are being used for are different. For example, high ambient temperature sensor 70 is placed in a position to sense the overall ambient temperature of system A, and the sensor data is used to adjust the operation of system A so as to reduce the output of rectifiers/PCUs 18–24 in order to keep the rectifiers/PCUs from overheating. The battery temperature sensor 72 is located in contact with or immediately adjacent the back-up batteries 14. The information from the battery temperature sensor 72 is used to reduce the output of the rectifiers/PCUs 18–24 in order to lower the temperature of the back-up batteries in order to stop the back-up batteries from destroying themselves due to overheating. Thus, in both situations there is a reduction in the rectifier output, however, this change occurs for different reasons.

It has been observed that it is also possible to accomplish the above single set point control not only by controlling the system level current limit, but also by supplying a system level voltage value to controller 16 and supplying that value to rectifiers/PCUs 18–24, which then adjust the output voltage of rectifiers/PCUs 18–24 based on the supplied data. Under this scenario, in power distribution system A, controller 16 receives a set point voltage value, at for example 52.08 volts. This set point value is passed to rectifiers/PCUs 18–24 of power distribution system A, and using this value rectifiers/PCUs 18–24 adjust their operation to generate an output 52.08 volts. This is accomplished in a manner similar to obtaining system level current limit control, however, in this scenario it is not necessary to divide up the system voltage set point of 52.08 volts, since the voltages of rectifiers/PCUs 18–24 are all of the same values since they are connected in a parallel arrangement. Thus, when using system level voltage control, if it is desired to reduce current entering back-up batteries 14, it is just necessary to reduce the set point voltage value of controller 16, which will then forward the new set point value to rectifiers/PCUs 18–24, which in turn reduces output voltage until the current level entering into back-up batteries 14 drops.

For example, with the battery temperature sensor 72 and controller 16 in system A, if the temperature of back-up batteries 14 reaches too high a value, e.g. above desired set point, system level voltage control acts to reduce the output voltage of the rectifiers/PCUs 18–24 thus reducing the battery charge current. Alternatively, using data from battery current sensor 76, the system level voltage can be reduced to allow a preset charge current to flow into back-up battery 14.

The results of operations with sensors 70–76 are the same, whether these functions are done by changing the system level current limit to the point that only the current that is desired is permitted to flow or if the system level voltage is reduced so that only the desired current flows.

Figure 6:
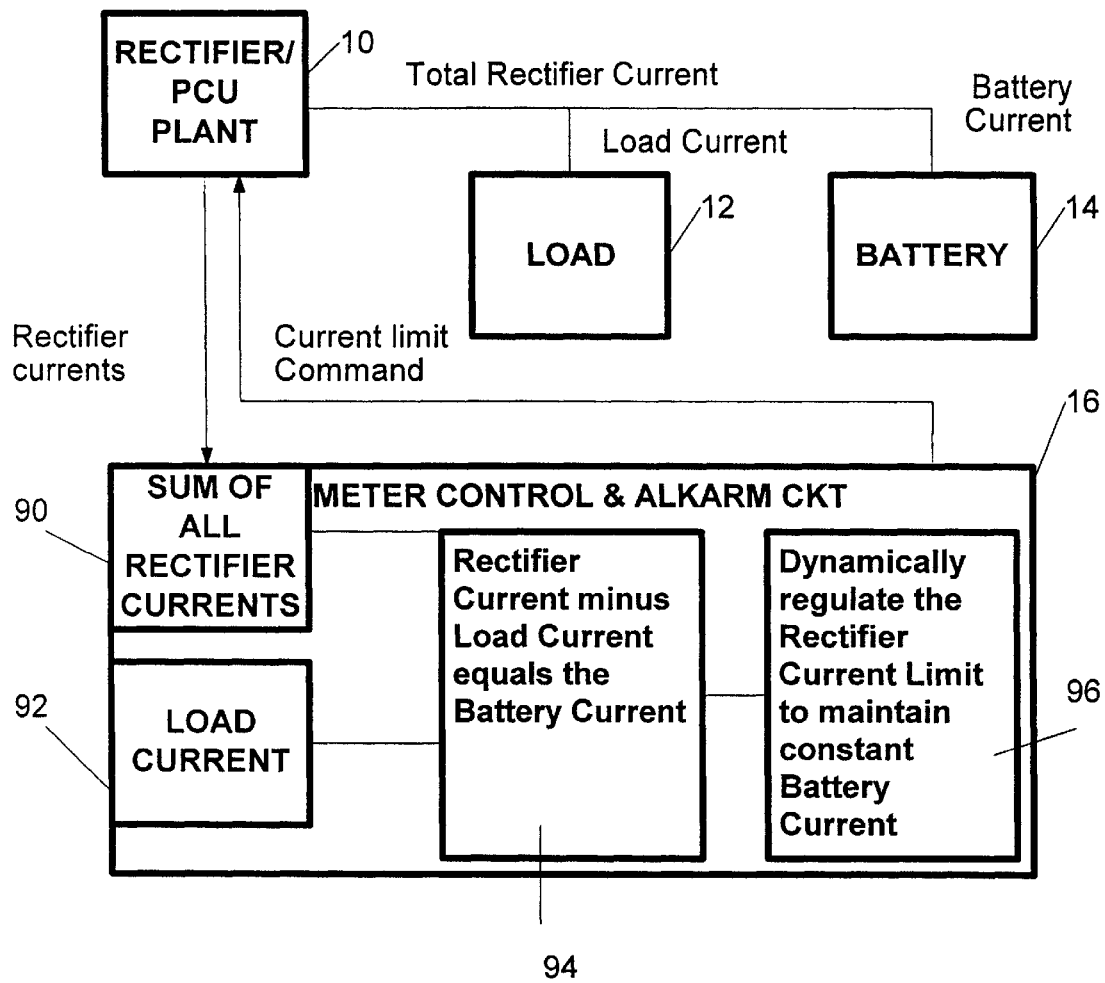
FIG. 6 illustrates a software control technique for re-charge current limiting.

FIG. 6 illustrates an arrangement of re-charge current limiting implemented by software control including the intelligent controller 16 and the rectifier/PCU plant 10, including rectifiers/PCUs 18–24, feeding load 12. Additionally shown is back-up battery configuration 14 which supplies load 12 during low or no operation of rectifier/PCU plant 10. In this configuration, controller (MCA) 16 monitors both the sum of the rectifier currents 90 and the load current 92. This can be accomplished by use of the sensors 70–76.

Controller 16 takes the difference between these currents and calculates the battery current 94. Using the capability of controller/MCA 16 for the generation of system level current limiting, controller/MCA 16 assigns, on a dynamic basis, a current limit setting for each rectifier/PCU in rectifier/PCU plant 10. By providing the preceding steps, it is possible to determine and monitor the existing re-charge battery current. Controller 16 also functions to dynamically regulate the rectifier current limit to maintain constant battery current 96. This function of the controller 16 is accomplished by using the sensed load current and also acquiring information as to the acceptable re-charge battery current. This data is then used as previously discussed to obtain the system level current limit value. This system level current limit value is then divided as also previously discussed for use by the rectifiers/PCUs in rectifier/PCU plant 10.

Figure 7:
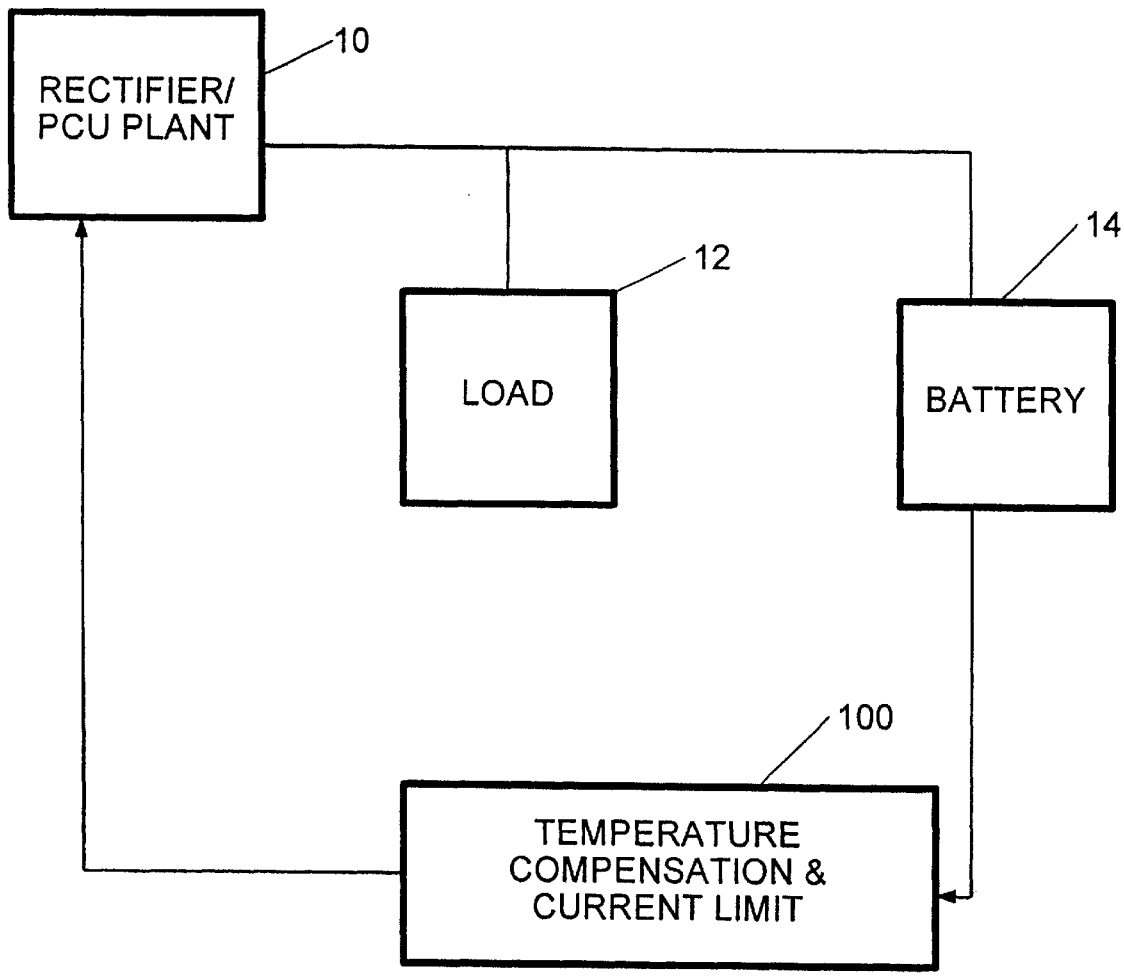
FIG. 7 illustrates a re-charge current limiting hardware control technique.

FIG. 7 discloses a hardware control technique for controlling re-charge current limit. Particularly, temperature compensation module 100 serves a dual function, by altering the rectifier output voltage to provide temperature compensated float voltage as well as monitoring and controlling battery re-charge current. The temperature compensation module 100 regulates the battery re-charge current by creating loop control via the rectifier voltage sensing circuit.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A method of generating a system level current limit in a power distribution system supplying a load, the power distribution system having a controller in operative connection with a plurality of intelligent power conversion units (PCUs) and, a re-chargeable back-up battery re-chargeable by the PCUs, the method comprising the steps of:

determining a number of active PCUs and their operational ratings;

transmitting information as to the number of active PCUs and their operational ratings to the controller;

determining a load current value;

determining a battery re-charge current value;

summing the load current value and the battery re-charge current value to obtain a system level current limit value;

storing the system level current limit value in the controller;

apportioning the system level current limit value in accordance with the number of active PCUs and their operational ratings, to obtain PCU current limit values for the active PCUs;

transmitting the obtained PCU current limit values to the active PCUs; and, adjusting the current limit of each of the active PCUs according to the obtained PCU current limit values.

2. The method according to claim 1 wherein the system level current limit is obtained by using a single point of control in the controller.

3. The method according to claim 1 wherein system level current limit is maintained by turning selected PCUs to an off state.

4. The method according to claim 1 further including obtaining ambient temperature information from an ambient temperature sensor, and adjusting the system level current limit value based on the ambient temperature information.

5. The method according to claim 1 further including obtaining battery temperature information from a battery temperature sensor, and adjusting the system level current limit value based on the battery temperature information.

6. The method according to claim 1 further including obtaining load current information from a load current sensor, summing the sensed load current information to a predetermined battery re-charge current, and adjusting the system level current limit value in accordance with the summed value.

7. The method according to claim 1 further including obtaining battery charge current information from a battery charge current sensor, and adjusting the system level current limit value based on this information.

8. The method according to claim 1 further comprising:
adding a PCU to the power distribution system;
communicating existence and operational rating of the added PCU, to the controller;
adjusting the PCU current limit values generated by the controller based on the added PCU;
transmitting the adjusted PCU current limit values to the PCUs; and
adjusting the current limit of each of the active PCUs according to the adjusted PCU current limit values.

9. The method according to claim 1 further comprising:
removing a PCU from the power distribution system;
sensing by the controller that one of the active PCUs has been removed or become inoperable;
adjusting the PCU current limit values generated by the controller based on the sensed removed or inoperable PCU;
transmitting the adjusted current limit values to the PCUs; and
adjusting the current limit of each of the active PCUs according to the adjusted PCU current limit values.

10. The method according to claim 1 wherein the system level current limit value is set to the controller automatically.

11. The method according to claim 1 wherein the system level current limit value is input to the controller by an operator.

12. A method of generating a system level voltage limit in a power distribution system supplying a load, the power distribution system having a controller in operative connection with a plurality of intelligent power conversion units (PCUs) arranged in a parallel arrangement, a re-chargeable back-up battery re-chargeable by the PCUs, and sensors in operative connection with at least one of the controller and PCUs, the method comprising the steps of:

determining a number of active PCUs and their operational ratings;

transmitting information as to the number of active PCUs and their operational ratings to the controller;

obtaining a system level voltage limit value;

storing the system level voltage limit value in the controller;

transmitting the system level voltage limit values to the active PCUs;

adjusting the voltage limit of each of the active PCUs according to the obtained voltage limit values;

obtaining sensor information for the controller by one of the sensors; and re-adjusting the system level voltage limit value based on the obtained sensor information.

13. The method according to claim 12 wherein the obtained sensor information is ambient temperature information from an ambient temperature sensor, and the re-adjusting of the system level voltage limit value is based on the obtained ambient temperature information.

14. The method according to claim 12 wherein the obtained sensor information is battery temperature information from a battery temperature sensor, and the re-adjusting of the system level voltage limit value based on the battery temperature information.

15. The method according to claim 12 wherein the obtained sensor information is load current information from a load current sensor, which is summed to a predetermined battery re-charge current, and the re-adjusting of the system level voltage limit value is done in accordance with the summed value.

16. The method according to claim 12 wherein the obtained sensor information is battery charge current information from a battery charge current sensor, and the re-adjusting of the system level voltage limit value is based on this information.

17. A system level current/voltage limit apparatus in a power distribution system supplying a load, the system level current/voltage limit apparatus comprising:

a controller;

a plurality of intelligent power conversion units (PCUs) in operative connection with each of the PCUs and;

a re-chargeable back-up battery in operative connection with the PCUs such that the re-chargeable back-up battery is capable of being recharged by the PCUs, the controller configured to obtain and store information from the PCUs as to the number of PCUs which are active and the operational ratings of the active PCUs, the controller further configured to obtain at least one of (i) a system level current limit value and (ii) a system level voltage limit value, wherein the controller is capable of at least one of (i) apportioning the system level current limit value among the active PCUs and setting the apportioned current limit values to the active PCUs and (ii) setting the system level voltage limit value to the active PCUs, the active PCUs configured to adjust an output based on the limit values set to the active PCUs.

* * * * *